US006578610B2

(12) United States Patent
Ristolainen

(10) Patent No.: US 6,578,610 B2
(45) Date of Patent: Jun. 17, 2003

(54) AUTOMATIC FELLER/BUNCHER CLAMP CONTROL

(75) Inventor: Mikko J. Ristolainen, Woodstock (CA)

(73) Assignee: Timberjack Inc., Woodstock (CA)

(*) Notice: Subject to any disclaimer, the term of this patent is extended or adjusted under 35 U.S.C. 154(b) by 0 days.

(21) Appl. No.: 09/888,314

(22) Filed: Jun. 22, 2001

(65) Prior Publication Data

US 2002/0040741 A1 Apr. 11, 2002

Related U.S. Application Data

(60) Provisional application No. 60/215,002, filed on Jun. 29, 2000.

(51) Int. Cl.[7] .................. A01G 23/08; B23Q 15/00; B23Q 16/00
(52) U.S. Cl. ............. 144/382; 144/4.1; 144/24.13; 144/336; 144/343; 144/356; 144/391; 144/430
(58) Field of Search ................ 144/4.1, 24.13, 144/34.1, 335, 336, 343, 356, 357, 382, 430, 391; 91/171, 412, 448, 459

(56) References Cited

U.S. PATENT DOCUMENTS 3,875,983 A * 4/1975 Kurelek ............... 144/4.1 X 3,886,985 A * 6/1975 Iarocci et al. ............ 144/4.1 X
3,910,326 A * 10/1975 Tucek ..................... 144/34.1

OTHER PUBLICATIONS

Applicant's Exhibit A—Four–page brochure of RSI Technologies Ltd., regarding "The Coordinator", admitted prior art.
Applicant's Exhibit B—One–page brochure of Quadco Equipment Inc. entitled Quad Tooth System, simply the "best saw system in the industry", admitted prior art.

* cited by examiner

Primary Examiner—W. Donald Bray
(74) Attorney, Agent, or Firm—Quarles & Brady LLP

(57) ABSTRACT

A clamp control system for a feller/buncher has three buttons for automating the operation of the harvesting and accumulating clamps. A CLOSE button, when momentarily actuated for the first tree of a bundle, closes the harvesting clamp and the accumulating clamp and then re-opens the harvesting clamp. When actuated again momentarily for the second and subsequent trees, the harvesting clamp closes, the accumulating clamp opens and re-closes and the harvesting clamp re-opens. Actuation of an OPEN button opens both clamps and resets the system to be ready for the first tree of the next bundle. Actuation of a STOP/CANCEL button freezes both clamps in their current positions.

22 Claims, 7 Drawing Sheets

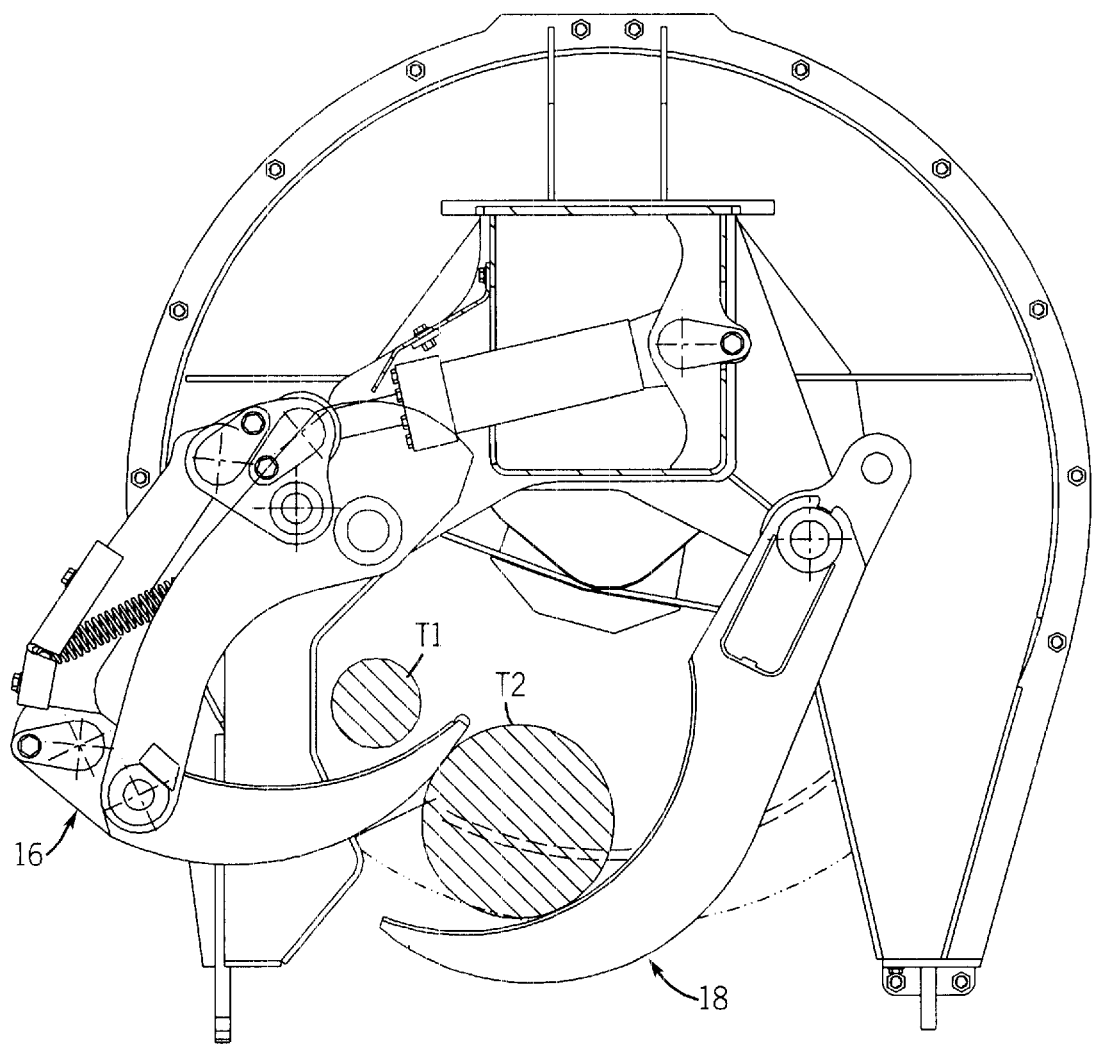

AUTOMATIC FELLER/BUNCHER CLAMP CONTROL

CROSS-REFERENCE TO RELATED APPLICATIONS

This claims the benefit of U.S. Provisional Patent Application No. 60/215,002 filed Jun. 29, 2000.

STATEMENT REGARDING FEDERALLY SPONSORED RESEARCH OR DEVELOPMENT

Not Applicable.

1. Field of the Invention

This invention relates to forestry equipment, and in particular to control of a feller buncher.

2. Background of the Invention

Feller buncher heads are widely used in the logging industry for accumulating in a vertical position several freshly cut trees prior to laying down the bundle at once, to be transported to roadside by a skidder or forwarder. The felling head is mounted to a heavy duty vehicle, such as a drive to tree or swing to tree wheeled or tracked vehicle, for high efficiency logging.

A feller buncher head may use a saw blade disc, a shear, or other means for severing the tree. FIGS. 1–3C illustrate a typical disc saw feller buncher 10. After severing, each tree is added to the bundle already cut which is supported on a butt plate of the head and held in place by a pivotable hydraulically operated accumulator arm 16. As the tree is cut, it is typically stabilized by one or more pivotable hydraulically operated harvesting arms 18. Typically, as illustrated, two harvesting arms 18 are provided which move in unison, are vertically spaced apart and are hinged to the frame 20 of the head to pivot about a vertical axis on one side of the frame. A single accumulator arm 16 is typically provided, positioned vertically between the two harvesting arms 18 and hinged to pivot from the opposite side of the frame 20.

When the cut of the first tree T1 is completed, the accumulator arm 16 is actuated by extending a hydraulic cylinder 22 (FIG. 3A) to hold the tree in the side pocket position shown in FIG. 3B, where the butt end of the tree is trapped against the pocket walls 39 and the upper part of the trunk is trapped against the fixed upper arms 41, also known as the horn. After the next tree T2 is cut (FIG. 3B), harvesting arms 18 are actuated by extending another cylinder 22 (illustrated in FIG. 1) to pull the tree into the pocket while at the same time actuating the arm 16 to withdraw it from the bundle and bring it back around the bundle including the newly cut tree (see FIG. 3C). The several operations of the hydraulic cylinders 22 are typically manually performed separately, and, although the operations are repetitious, it requires considerable skill to efficiently cut, accumulate and unload trees. Thus, improvement is needed to perform these operations.

SUMMARY OF THE INVENTION

Automatic felling head control according to the present invention decreases the amount of manual clamp functions during felling and accumulating operations. Instead of operating clamps separately using manual clamp buttons, the accumulator and harvesting clamps are operated as a system.

A felling head control of the invention preferably uses a microprocessor based controller to operate the felling head clamps automatically during felling/bunching operations. The felling head can be controlled by the operator with just two actuators, for example, buttons; one to collect trees and the other to dump bunches. Each actuator controls at least one function of each of the accumulator and harvesting clamps. Manual control buttons are also available in parallel to the automatic control.

When cutting trees with manual control, each accumulated tree usually requires four buttons to be pressed (harvesting clamps close—accumulator clamps open—accumulator clamps close—harvesting clamps open). In addition, all the buttons have to be held down as long as the clamp movement is required. Clamp automation reduces the amount of button activation according to the following calculations (numbers indicate how many buttons have to be pressed to make bunches using different methods):

| # of trees in a bunch | Manual method | Automatic method | Difference |
| --- | --- | --- | --- |
| 1 | 4 times | 2 times | 2 times |
| 2 | 6 | 3 | 3 |
| 3 | 10 | 4 | 6 |
| 4 | 14 | 5 | 9 |
| 5 | 18 | 6 | 12 |
| 6 | 22 | 7 | 15 |
| 7 | 26 | 8 | 18 |
| 8 | 30 | 9 | 21 |

The above table shows that automatic control according to the invention reduces button operations 50–70%. The system will become more effective as bunch size grows. In addition the buttons do not have to be pressed for the entire duration of the movement, only a short pulse is required.

If a felling head is accumulating trees normally, automated operation according to the invention is as or more efficient as the manual method, and helps to reduce operator fatigue considerably.

In one aspect of the invention, when an actuator of the system is actuated for a first tree, the control system closes a harvesting clamp and an accumulator clamp, and then re-opens the harvesting clamp. This automates the cutting and accumulation of the first tree, and readies the machine for the next tree. Preferably in this aspect, the actuator can also be actuated to close both clamps and hold them closed, for example by holding down the actuator for an extended period. This would be used when cutting the last tree.

Preferably, when the actuator is actuated for a second tree being accumulated, the control system closes the harvesting clamp, opens the accumulating clamp, re-closes the accumulating clamp and re-opens the harvesting clamp. This control sequence replaces several steps in comparison to manual operation of the clamps. In addition, in this connection, an advance may be provided, so that the accumulating clamps start to open before the harvesting clamps are completely closed.

It is also preferred that the control system is programmable, and preferably by the operator him or herself, so that advance and delay times can be adjusted in the field for the most efficient operation of the machine.

In another preferred aspect, a second actuator is provided which when actuated opens both of the clamps. This is used for dumping the trees and to reset the system for the next bundle. It is also preferred to provide a third actuator, which when actuated stops all clamp functions.

BRIEF DESCRIPTION OF THE DRAWINGS

FIG. 3C is a view like FIG. 3B, but shown accumulating the second tree;

DETAILED DESCRIPTION OF THE PREFERRED EMBODIMENT

Figure 1:
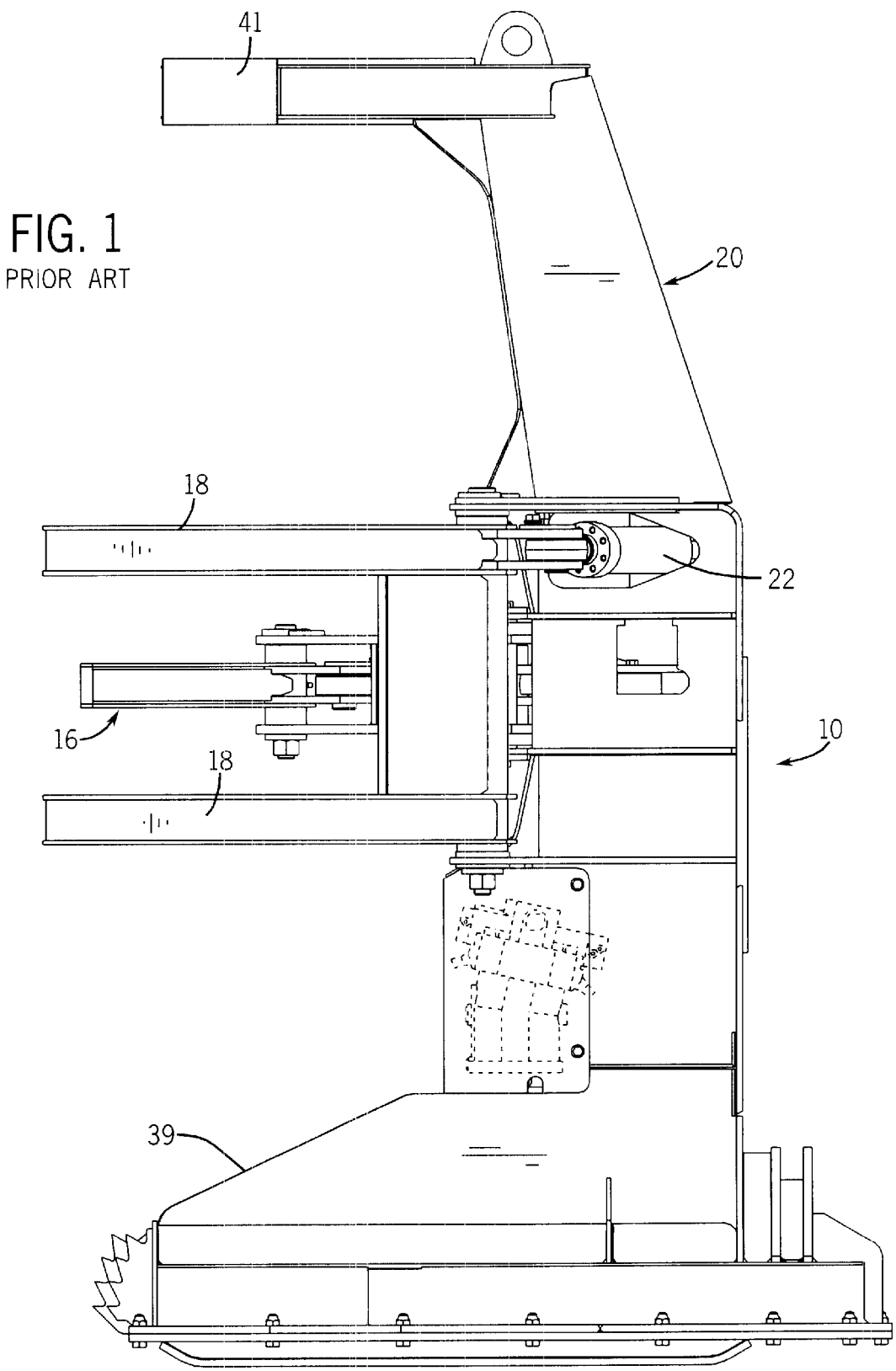
FIG. 1 is a side plan view of a prior art felling head.
Figure 2:
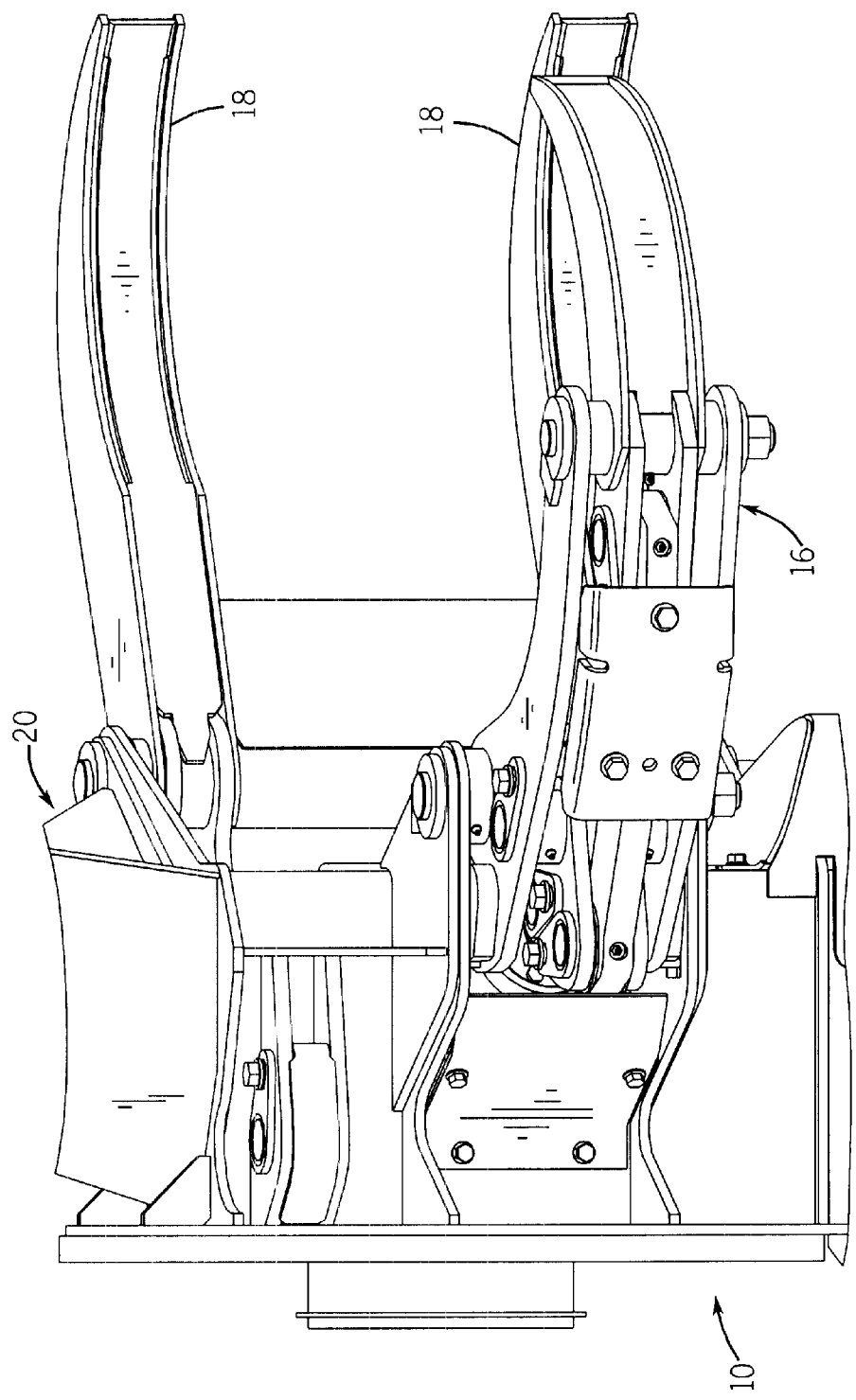
FIG. 2 is a detail perspective view illustrating the accumulator arm of the felling head of FIG. 1.
Figure 3A:
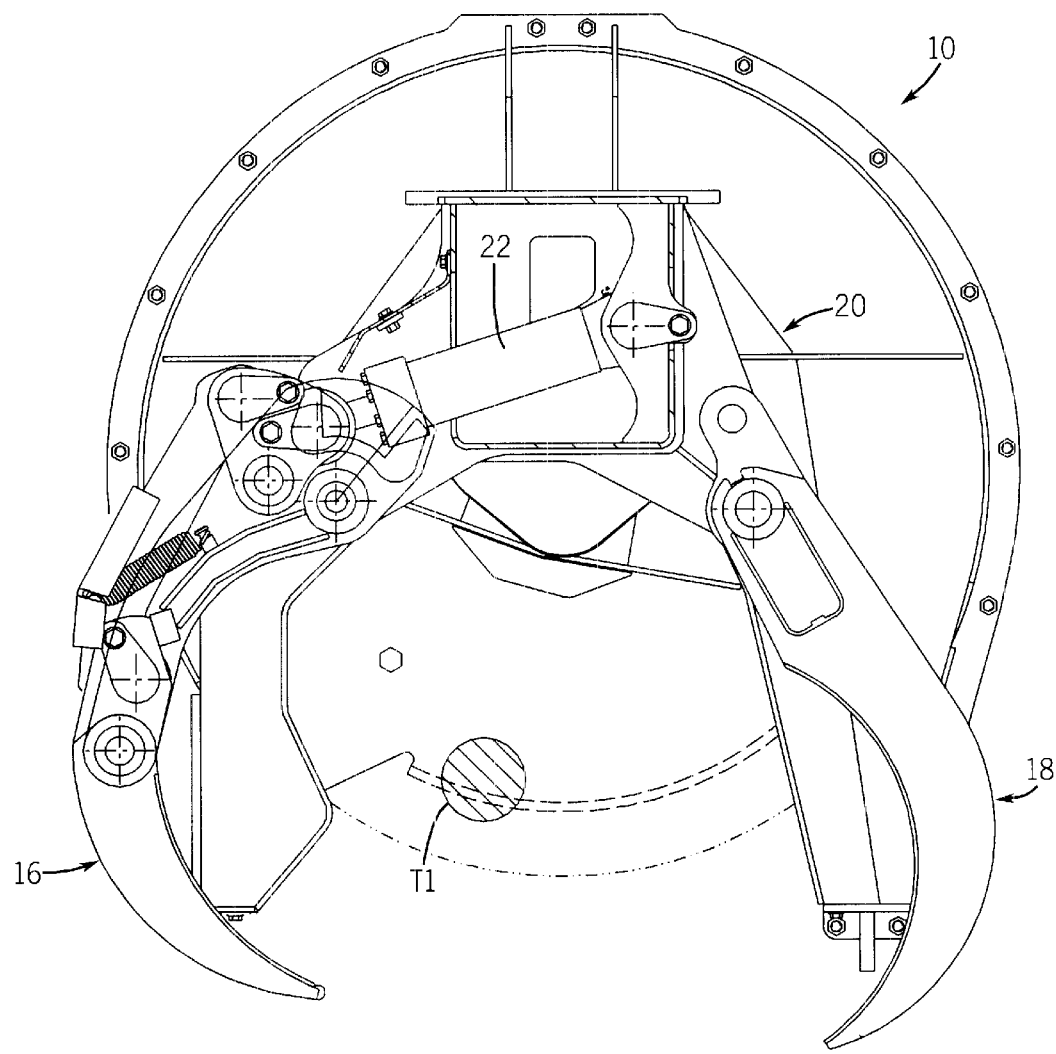
FIG. 3A is a top sectional schematic view of the prior art felling head of FIG. 1 in a fully open position and cutting the first tree of a bundle.
Figure 3B:
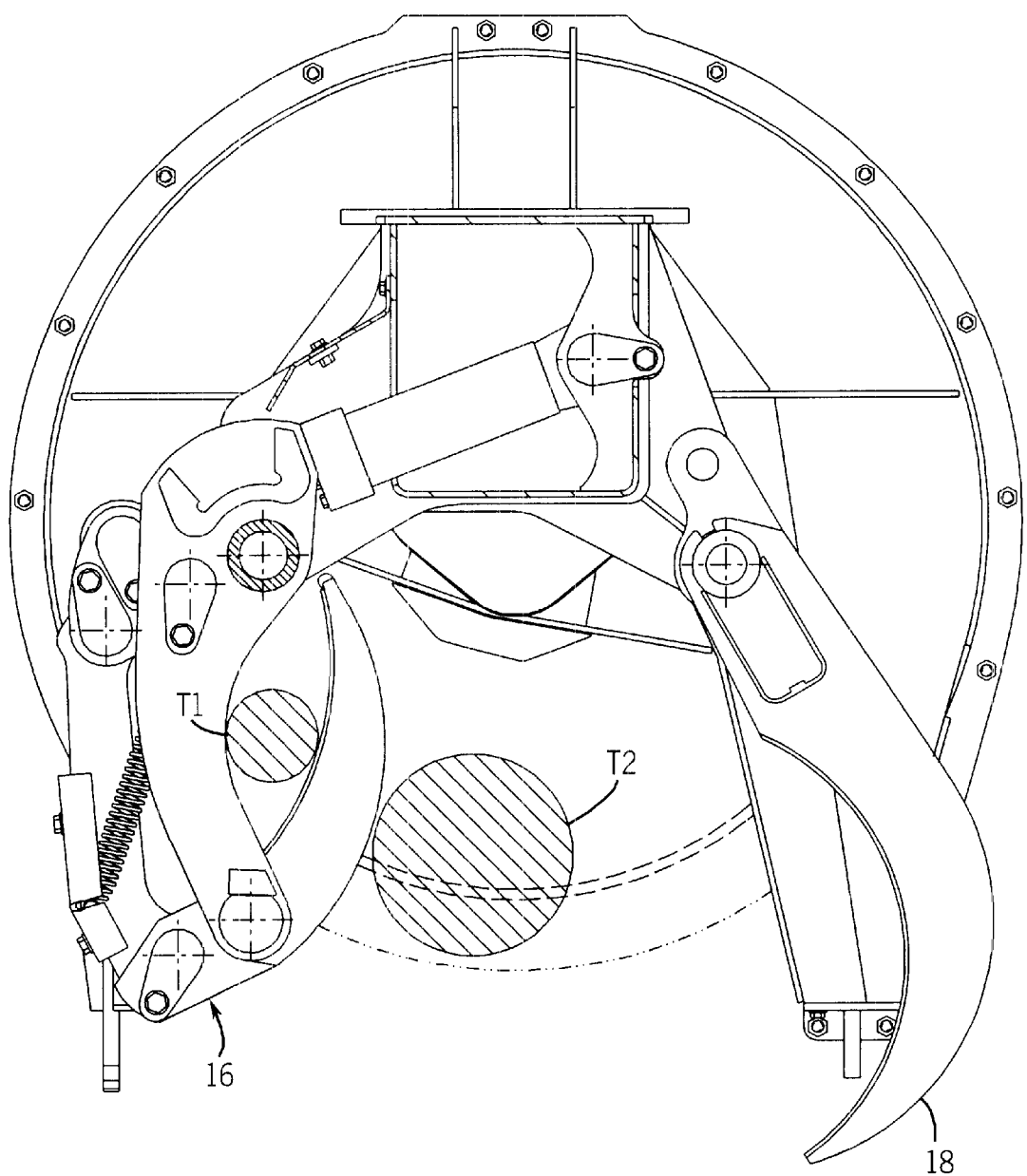
FIG. 3B is a view like FIG. 3A, but cutting a second tree of the bundle.
Figure 4:
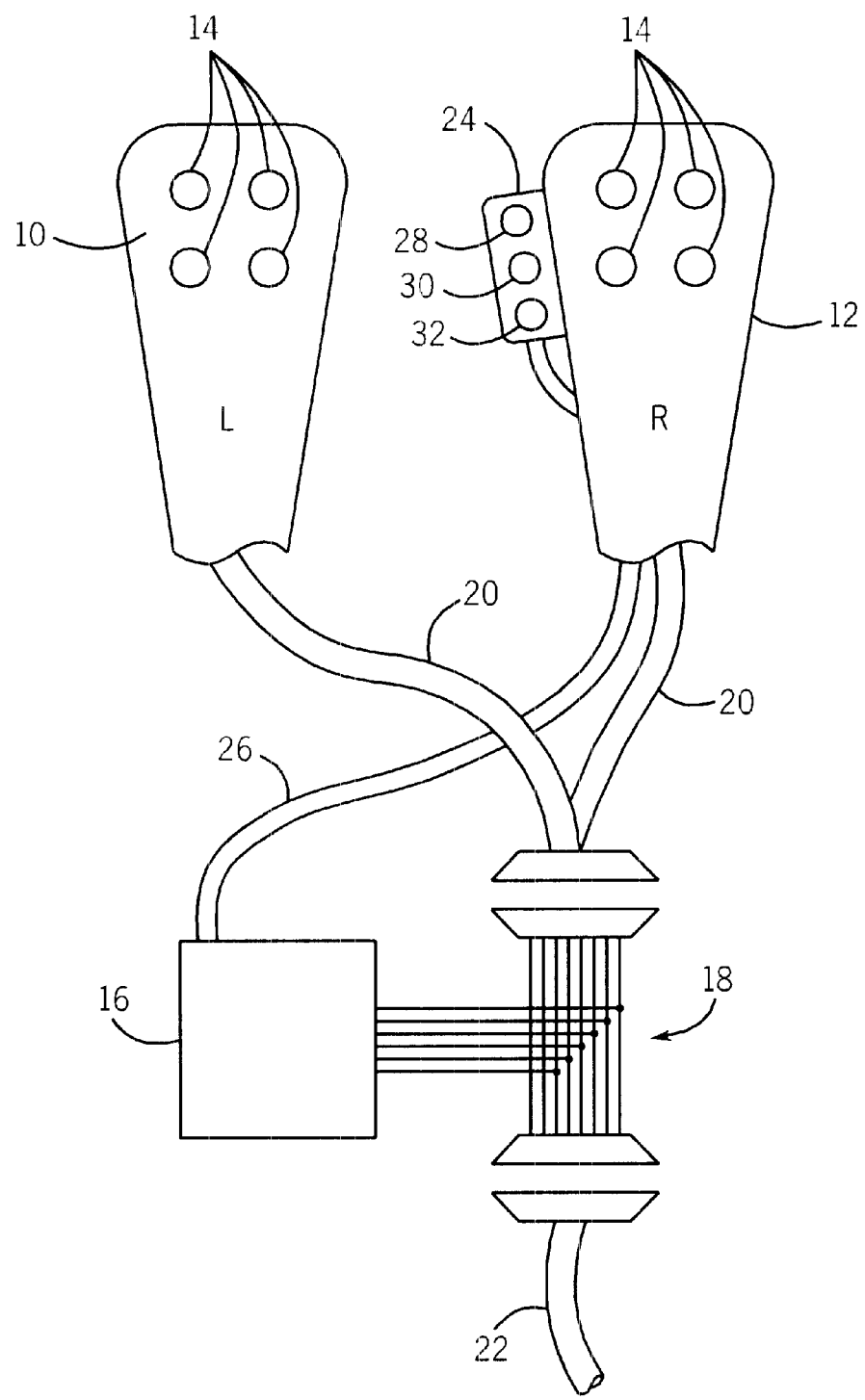
FIG. 4 is a view of an operator interface system layout of the present invention.

A typical layout of an operator interface for a system of the invention is illustrated in FIG. 4. The left and right joysticks 10, 12 illustrated in FIG. 4 have the usual manual single function buttons 14 which are not part of the invention and are normally provided in typical feller/bunchers.

There are at least two ways to apply a system of the invention to a feller/buncher. One way is as an add-on installation, so that many if not all feller/bunchers currently operating in the field may have this system easily added to them, using their existing hydraulic pumps, cylinders, lines and solenoid valves. An add-on system of the invention is illustrated in FIG. 4 and consists of a controller 16, an adapter harness 18 and an additional three-button bar 24 that is attached to one of the the existing joystick handles, as shown to the right handle 12. The harness of the three-button bar 24 will connect between the existing joystick harness 20 and the panel harness 22 using the existing connectors. No rework for the existing machine harness 20, 22 is necessary and installation can be done in minutes with a few tools. The whole system is an add-on package, and can be installed on different feller bunchers just by modifying the adapter harness 18. The controller 16 is connected to the button bar 24 by cable 26, and outputs from the controller 16 are connected to the existing electric control lines in the joystick harness 20, 22, which control the existing hydraulic solenoid valves of the feller/buncher, which control the hydraulic cylinders. Wire splicing is done in the adapter harness 18. Power supply for the controller comes from the joystick power wires.

A second way to incorporate the invention in the controls of a feller/buncher is to include it in a complete machine control system. This way the felling head control is just part of the application software with possibly a few additional buttons on the joystick handles.

Three buttons 28, 30, 32, or other human operable actuators are preferred for the operation of a control system of the invention. In the preferred embodiment, these are identified as close (button 28), open (button 30) and cancel/stop (button 32). Other monikers could be used to identify these actuators. Their functions are described as follows:

Close Button 28

This button is used to accumulate trees during cutting. Its function is generally described as to close the clamps of the head. Two alternative operations are preferably executed with this button, depending on how long the button is pressed. If pressed briefly, both clamps are closed, followed by the opening of the harvesting clamps. If pressed for a longer period, both clamps close and stay closed.

Open Button 30

This button is used to open both the accumulating and harvesting clamps to dump a bunch and reset the sequence for a new bunch.

Cancel/Stop Button 32

This button is for stopping the sequence in case of an accumulation fault or emergency situation.

Figure 5:
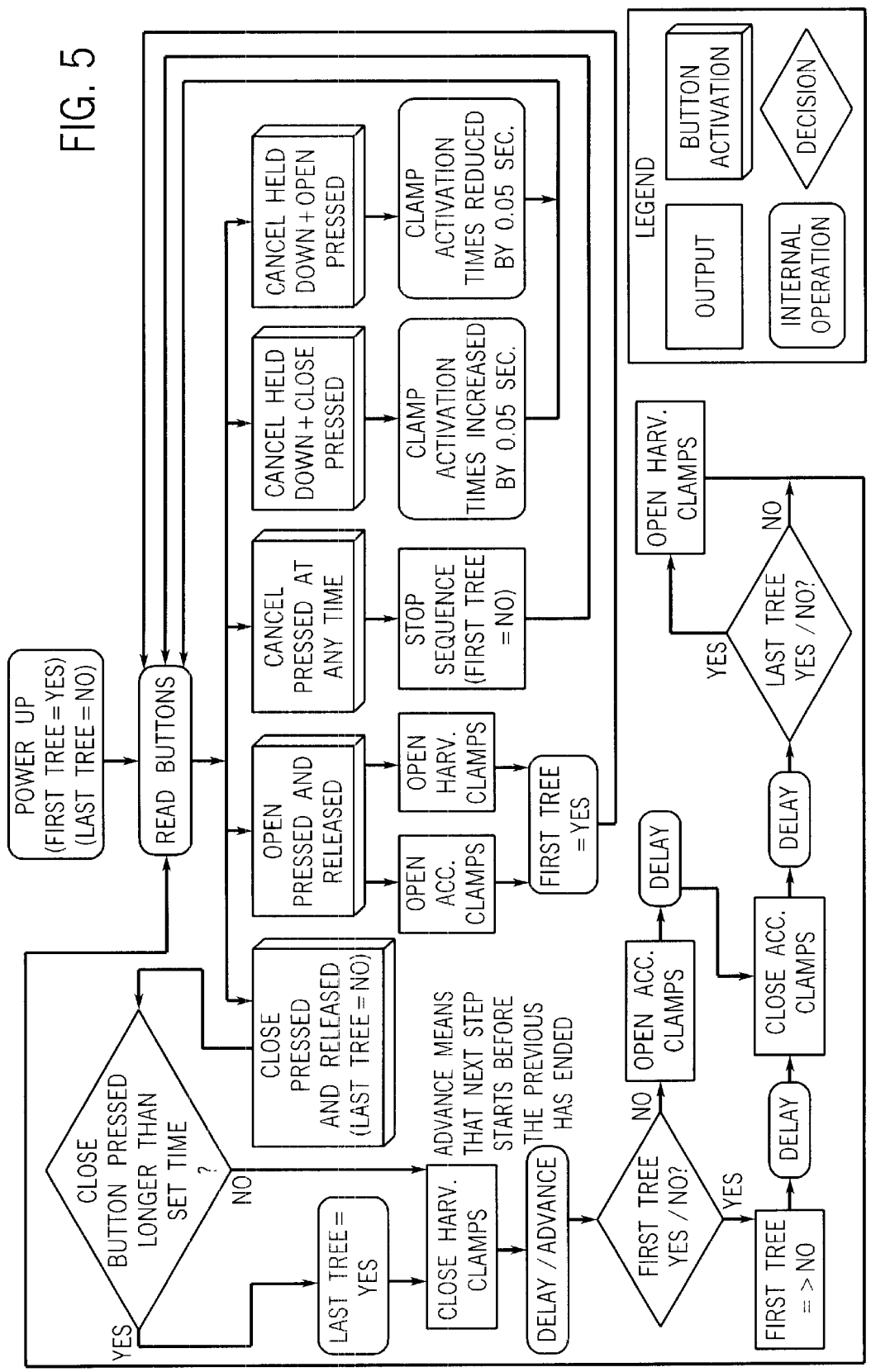
FIG. 5 is a flow chart illustrating steps for carrying out a control system of the invention.

The basic logic flow of a control system of the invention is illustrated in the flow chart of FIG. 5. The logic flow of FIG. 5 shows only one way to set parameter values. This concept can be implemented using different controllers. If the controller used has a display, the timing and other parameters can be set using the display. Programming of a controller to carry out a method of the invention is well within the level of ordinary skill in the art.

The controller gets its power from the joystick power supply, which is typically controlled by the hydraulic pilot valve control switch. This way the controller works only when the hydraulic pilot valve control system is activated. Alternatively, a separate switch can be used to turn the controller on/off.

As stated above, a system of the invention has three control buttons 28, 30, 32. OPEN button 30 and CLOSE button 28 control tree accumulation and dumping. The third button 32, CANCEL, is for stopping the operation immediately.

The controller resets itself during power up. Reset also occurs every time the OPEN button is pressed. Reset sets the logic ready for the first tree.

Sequence operation is started by pressing the OPEN button 30. This opens both the harvesting and accumulation clamps and resets the sequence. When the control system is first turned on, it defaults to this position, in which position the head is ready to cut the first tree of a bundle.

When the first tree (T1) is cut, the CLOSE button 28 is pressed briefly and the head closes. First the harvesting clamps close, then the accumulator clamps close. After both clamps have been closed, the harvesting clamps are opened for the next tree and the accumulator clamp stays closed. For a single tree bunch, or for the last tree to be accumulated, the CLOSE button 28 can be held down longer (e.g., for 0.5 sec) to cause both clamps to close and stay closed. (See the description regarding the last tree, below.)

The next tree (T2) and all subsequent trees are accumulated by hitting the CLOSE button 28 again. The harvesting clamps close, and since there is already a tree in the head, the accumulator clamps will be opened and closed to hold both trees cut so far. The accumulator clamps can be set to start opening before the harvesting clamps are fully closed, referred to as "advance", to ease the accumulator clamp operation and to speed up the sequence. After the accumulator clamps have re-closed, the harvesting clamps are opened for the next tree.

The sequence explained above will be repeated for any subsequent trees accumulated into the bunch.

When the last tree is being accumulated, the CLOSE button 28 is pressed and held down for 0.5 sec (adjustable). The harvesting clamps will close and stay closed. The accumulator arm stays closed for the last tree. This last tree cycle can be used to cut a single tree as well.

The accumulated bunch (or a single tree) is dumped by pressing the OPEN button 30, which opens both clamps and resets the control sequence for the next bunch.

At any time during the sequence operation, the CANCEL button 32 will stop the clamp operation in its current position. If the sequence is stopped during the first tree or accumulation step, the sequence can be resumed by pressing the CLOSE button 28, which activates the subsequent tree cycle.

In order to make the sequence more controllable, there is a delay after each sequence step. The length of this delay is defined by the parameter SEQUENCE STEP DELAY.

Optionally, the system may be programmed to stop immediately if any manual buttons are pressed.

There are certain times which must be set to program the invention. No sensors are used to sense clamp or cylinder positions, although sensors could be incorporated to carry out the invention. In the embodiment disclosed, the required times to be input to the controller or incorporated in the software are as follows:

HARVESTING CLAMP OPEN TIME—the time it takes to open the harvesting clamps after the signal is sent to the valve to open them.

HARVESTING CLAMP CLOSE TIME—the time it takes to close the harvesting clamps after the signal is sent to the valve to close them.

ACCUMULATOR CLAMP OPEN TIME—the time it takes to open the accumulator clamp after the signal is sent to the valve to open it.

ACCUMULATOR CLAMP CLOSE TIME—the time it takes to close the accumulator clamp after the time the signal is sent to the valve to close it.

In the preferred embodiment, open and close time settings have a range of 0.70–1.50 seconds, with an increment of 0.05 seconds. The default value for all clamp movement times is 1.00 seconds.

SEQUENCE STEP DELAY—Delay between different sequence steps (range 0–2 seconds, increment 0.1 seconds, default 0.0 seconds).

ACCUMULATOR OPEN ADVANCE—The accumulator clamps can be set to start to open before the harvester clamps are fully closed. This parameter defines how much before the harvesting clamps are closed the accumulator clamps start to open. (range 0-HARVESTING CLAMP OPEN TIME seconds, increment 0.05 sec.)

The program code in the preferred embodiment has default parameters as stated above. Specific settings will depend on the particular controller being used.

The method of adjusting the above parameters depends on the controller used. If the controller has a display or the concept is used as part of a control system with display, the parameters can be adjusted using the display interface. This method allows more versatile individual parameter adjustments.

If the controller used does not have a display, a manual method has to be used to set functional times. In the flow chart of FIG. 5, manual adjustments can be done by holding down the CANCEL button 32, and at the same time pressing the OPEN button 30 to increase and the CLOSE button 28 to reduce the values. Each time the OPEN button 30 is pressed, all of the activation times are increased by 0.05 seconds, and each time the CLOSE button 28 is depressed, all of the activation times are reduced by 0.05 seconds. This method only adjusts a general time factor, which affects all the movement times. Advance and other parameters are not adjustable with this manual method.

Automated head clamp operation according to the invention helps operators to stay less fatigued and cut more trees for longer. It can also potentially reduce errors with fatigued operators by keeping the accumulation routine constantly similar.

A preferred embodiment of the invention has been described in considerable detail. Many modifications and variations will be apparent to those skilled in the art. Therefore, the invention should not be limited to the embodiment described, but should be defined by the claims which follow.

I claim:

1. In a feller/buncher clamp control system for a feller/buncher having a frame, a harvesting clamp movably attached to the frame to open and close about a standing tree and an accumulator clamp movably attached to the frame to open and close about one or more cut trees, the control system having at least one actuator operable by an operator to operate the clamps, the improvement wherein when said actuator is actuated for a first tree, said control system closes said harvesting clamp and said accumulator clamp, and then re-opens the harvesting clamp.

2. A feller/buncher clamp control system as claimed in claim 1, wherein said actuator can be actuated to close both clamps and hold them closed.

3. A feller/buncher clamp control system as claimed in claim 2, wherein said actuator is actuated to close both clamps and hold them closed by said operator holding said actuator in an actuated position for an extended period of time.

4. A feller/buncher clamp control system as claimed in claim 1, further comprising a second actuator which when actuated by said operator opens both of said clamps.

5. A feller/buncher clamp control system as claimed in claim 4, further comprising a third actuator which when actuated by said operator stops all clamp functions.

6. A feller/buncher clamp control system as claimed in claim 1, wherein when said actuator is actuated by said operator for a second tree being accumulated said control system closes said harvesting clamp, opens said accumulating clamp, re-closes said accumulating clamp and re-opens said harvesting clamp.

7. A feller/buncher clamp control system as claimed in claim 1, wherein said accumulating clamp starts opening before said harvesting clamp is fully closed.

8. A feller/buncher clamp control system as claimed in claim 1, wherein said system is programmable.

9. A feller/buncher clamp control system as claimed in claim 8, wherein said system is programmable by the operator actuating actuators of the system in a particular sequence.

10. In a feller/buncher clamp control system for a feller/buncher having a frame, a harvesting clamp movably attached to the frame to open and close about a standing tree and an accumulator clamp movably attached to the frame to open and close about one or more cut trees, the control system having at least two actuators for opening and closing the harvesting clamp and the accumulator clamp, the improvement wherein each of said actuators controls at least one function of each of said clamps.

11. The improvement of claim 10, wherein at least one of said actuators when actuated for a first tree closes the harvesting clamp and the accumulator clamp, and then re-opens the harvesting clamp.

12. The improvement of claim 11, wherein said at least one of said actuators can be actuated to close both clamps and hold them closed.

13. The improvement of claim 12, wherein said at least one of said actuators is actuated to close both clamps and hold them closed by holding said actuator in an actuated position for an extended period of time.

14. A feller/buncher clamp control system as claimed in claim 11, wherein when at least one of the actuators is actuated for a second tree being accumulated said control system closes said harvesting clamp, opens said accumulating clamp, re-closes said accumulating clamp and re-opens said harvesting clamp.

15. A feller/buncher clamp control system as claimed in claim 14, wherein for said second tree said accumulating clamp starts opening before said harvesting clamp is fully closed.

16. The improvement of claim 11, wherein the other of said actuators opens both of said clamps when it is actuated.

17. The improvement of claim 10, further comprising a third actuator which when actuated stops all clamp functions.

18. A feller/buncher clamp control system as claimed in claim 10, wherein said system is programmable.

19. A feller/buncher clamp control system as claimed in claim 18, wherein said system is programmable by the operator actuating actuators of the system in a particular sequence.

20. In a feller/buncher clamp control system for a feller/buncher having a frame, a harvesting clamp movably attached to the frame to open and close about a standing tree and an accumulator clamp movably attached to the frame to open and close about one or more cut trees, the improvement wherein the control system has at least three actuators, each of which controls at least one function of both of said clamps, a first of said actuators being operable to close both of said clamps, a second of said actuators being operable to open both of said clamps, and a third of said actuators being operable to stop movement of both of said clamps.

21. A feller/buncher clamp control system as claimed in claim 20, wherein said first actuator can be operated to either hold the harvesting clamp closed or to re-open it after closing it.

22. A feller/buncher clamp control system as claimed in claim 20, wherein when said first actuator is actuated for a second or subsequent tree being accumulated said control system closes said harvesting clamp, opens said accumulating clamp, re-closes said accumulating clamp and re-opens said harvesting clamp.

\* \* \* \* \*